(12) United States Patent
Jeong et al.

(10) Patent No.: US 12,223,293 B2
(45) Date of Patent: Feb. 11, 2025

(54) RANDOM NUMBER GENERATION METHOD AND RANDOM NUMBER GENERATOR USING INORGANIC SCINTILLATOR

(71) Applicant: EYL INC., Yongin-si (KR)

(72) Inventors: Bu Suk Jeong, Yongin-si (KR); Dae Hyun Nam, Seoul (KR); Jung Hyun Baik, Seongnam-si (KR); Seong Joon Cho, Seongnam-si (KR); Jun Ha Jin, Daejeon (KR)

(73) Assignee: EYL INC., Yongin-si (KR)

( * ) Notice: Subject to any disclaimer, the term of this patent is extended or adjusted under 35 U.S.C. 154(b) by 1007 days.

(21) Appl. No.: 17/267,911

(22) PCT Filed: Nov. 19, 2018

(86) PCT No.: PCT/KR2018/014066
§ 371 (c)(1),
(2) Date: Feb. 11, 2021

(87) PCT Pub. No.: WO2020/036259
PCT Pub. Date: Feb. 20, 2020

(65) Prior Publication Data
US 2021/0247965 A1    Aug. 12, 2021

(30) Foreign Application Priority Data
Aug. 13, 2018   (KR) .................. 10-2018-0094366

(51) Int. Cl.
*G06F 7/58*      (2006.01)
*C09K 11/58*     (2006.01)
(52) U.S. Cl.
CPC ............ *G06F 7/588* (2013.01); *C09K 11/584* (2013.01)

(58) Field of Classification Search
CPC ... G06F 7/58–588; C01G 9/08; C09K 11/584; C01P 2202/54
See application file for complete search history.

(56) References Cited

U.S. PATENT DOCUMENTS 3,707,631 A * 12/1972 Untermyer ................ G01T 3/06
                                                                250/363.01
6,745,217 B2 * 6/2004 Figotin ..................... G06F 7/588
                                                                708/250
(Continued)

FOREIGN PATENT DOCUMENTS

JP       07-162276 A    6/1995
JP       09-028899 A    2/1997
(Continued)

OTHER PUBLICATIONS

Park, C.H., Moon, J.H. & Seo, B.K. Development and characterization of the integrated fiber-optic sensor for remote detection of alpha radiation. Journal of the Korean Physical Society 63, 1720-1723 (2013). https://doi.org/10.3938/jkps.63.1720 (Year: 2013).*
(Continued)

*Primary Examiner* — Andrew Caldwell
*Assistant Examiner* — Carlo Waje
(74) *Attorney, Agent, or Firm* — ZION IP; Byungwoong Park

(57) ABSTRACT

A random number generation method and random number generator using a ZnS scintillator. The random number generator includes: a radioisotope emission layer emitting an alpha particle or a beta particle that is emitted when an atomic nucleus decays; a polymer layer disposed under the radioisotope emission layer; an inorganic scintillator layer disposed between the radioisotope emission layer and the polymer layer and applied with an inorganic scintillator substance; and a wafer layer disposed under the polymer
(Continued)

layer and including a photodiode detecting light produced from the inorganic scintillator layer.

3 Claims, 2 Drawing Sheets

(56) References Cited

U.S. PATENT DOCUMENTS

| | | | | |
|---|---|---|---|---|
| 7,663,169 | B2* | 2/2010 | Shibayama | H01L 27/14683 |
| | | | | 257/292 |
| 8,001,168 | B2* | 8/2011 | Tsuyuzaki | H01L 23/585 |
| | | | | 708/255 |
| 2017/0168166 | A1* | 6/2017 | Fischer | B05D 3/12 |
| 2020/0233102 | A1* | 7/2020 | Goto | G01T 1/2002 |

FOREIGN PATENT DOCUMENTS

| | | | |
|---|---|---|---|
| JP | 2014-182002 A | 9/2014 | |
| KR | 2006-0003335 A | 1/2006 | |
| KR | 10-1244853 B1 | 3/2013 | |
| KR | 2015-0011284 A | 1/2015 | |
| KR | 10-1699810 B1 | 1/2017 | |
| WO | WO-2007072796 A1 * | 6/2007 | ............... G07D 7/00 |

OTHER PUBLICATIONS

Komatsu et al. "Card Capable of Performing Authentication By Radio-Active Material Chip" is a Machine Translation of WO 2007072796 A1 (Year: 2007).*

Lee et al., "Comparison of New Simple Methods in Fabricating ZnS(Ag) Scintillators for Detecting Alpha Particles", in Progress in Nuclear Science and Technology, vol. 1, p. 194-197 (2011) (Year: 2011).*

International Search Report issued on May 3, 2019 in corresponding International application No. PCT/KR2018/014066; 5 pages.

* cited by examiner

RANDOM NUMBER GENERATION METHOD AND RANDOM NUMBER GENERATOR USING INORGANIC SCINTILLATOR

FIELD

The present disclosure relates to a random number generation method and random number generator using an inorganic scintillator, particularly, to a random number generation method and random number generator that generates natural random numbers from only an ultra-small amount of radioisotope using an inorganic scintillator.

BACKGROUND

As Internet of Thing (IoT) is being popularized, a security threat is also increasing and there is a need for security without disconnection throughout the entire period from IoT device to system for IoT security. In particular, since it is required to communicate with devices having various functions and protocols, an open standard technology should be used, so exposure to security threads is increasing.

Meanwhile, natural random numbers or true random numbers that are extracted from randomness of natural phenomenon are required to security among IoT devices. To this end, quantum random number generators using natural decay of radioisotopes have been developed. Using radioisotopes has a problem with permission, etc., so there is an effort to reduce the contents of radioisotopes.

As a relevant prior art, there are Korean Patent Application Publication No. 10-2015-0011284, titled "Immobilizer apparatus using random pulse generation and authentication method thereof" and Korean Patent No. 10-1244853, titled "Integration authentication method for user using random pulse generation.

SUMMARY

An objective of the present disclosure is to provide a random number generation method and random number generator using an inorganic scintillator, particularly, a random number generation method and random number generator that generates natural random numbers from only an ultra-small amount of radioisotope using an inorganic scintillator.

A random number generator according to an embodiment of the present disclosure includes: a radioisotope emission layer emitting an alpha particle or a beta particle that is emitted when an atomic nucleus decays; a polymer layer disposed under the radioisotope emission layer; an inorganic scintillator layer disposed between the radioisotope emission layer and the polymer layer and applied with an inorganic scintillator substance; and a wafer layer disposed under the polymer layer and including a photodiode detecting light produced from the inorganic scintillator layer.

According to the present disclosure, it is possible to enhance security among devices by generating random natural numbers from only an ultra-small amount of radioisotope using a scintillator.

According to the present disclosure, a photodiodes does not come in direct contact with an alpha particle or a beta particle that is emitted from a radioisotope emission layer, whereby it is possible to protect the photodiode.

DETAILED DESCRIPTION

Figure 1:
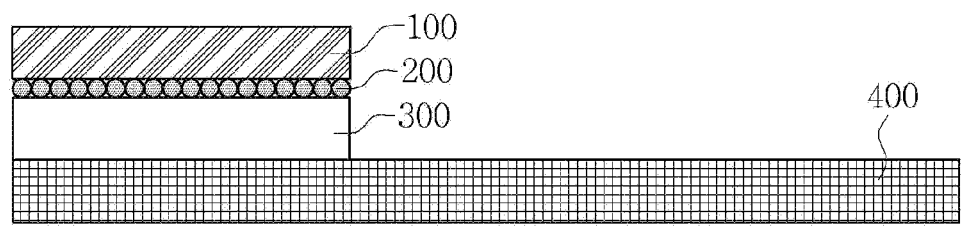
FIG. 1 is a view illustrating a random number generator according to an embodiment of the present disclosure.

The description of specific structures and functions of embodiments according to the spirit of the present disclosure described herein are provided as examples for describing the embodiments according to the spirit of the present disclosure. The embodiments according to the spirit of the present disclosure may be implemented in various ways and the present disclosure is not limited to the embodiments described herein.

Embodiments described herein may be changed in various ways and various shapes, so specific embodiments are shown in the drawings and will be described in detail in this specification. However, it should be understood that the exemplary embodiments according to the concept of the present disclosure are not limited to the specific examples, but all of modifications, equivalents, and substitutions are included in the scope and spirit of the present disclosure.

The terminology used herein is for the purpose of describing particular embodiments only and is not intended to limit the present disclosure Singular forms are intended to include plural forms unless the context clearly indicates otherwise. It will be further understood that the terms "comprises" or "have" used in this specification, specify the presence of stated features, numbers, steps, operations, components, parts, or a combination thereof, but do not preclude the presence or addition of one or more other features, numerals, steps, operations, components, parts, or a combination thereof.

Hereinafter, various embodiments of the present disclosure will be described in detail with reference to the accompanying drawings.

FIG. 1 is a view illustrating a random number generator according to an embodiment of the present disclosure.

Referring to FIG. 1, a random number generator 10 according to an embodiment of the present disclosure includes a radioisotope emission layer 100, an inorganic scintillator layer 200, a polymer layer 300, and a wafer layer 400.

The radioisotope emission layer 100 can emit an alpha particle or a beta particle (beta ray) that is emitted when an atomic nucleus decays. The alpha particle may be $Am^{241}$ that decays, but is not limited thereto. For example, the alpha particle may be at least one of $Pb^{210}$ isotope, $Cm^{244}$, and $Po^{210}$ that are emission of uranium. The beta particle (beta ray) may be at least one of H-3, Si-32, Ni-63, Cd-113m, Sm-151, and Sn-121m but is not limited thereto.

The inorganic scintillator layer 200 may be composed of a ZnS(Ag) inorganic scintillator. The inorganic scintillator layer 200 may be formed by squeezing and applying inorganic scintillator powder on the polymer layer 300 with a squeeze. The inorganic scintillator layer 200 is not limited to the ZnS(Ag) inorganic scintillator and may be at least one of CsI(Tl), NaI(Tl), LiI(Eu), and BGO.

The polymer layer 300 is disposed on the wafer layer 400 and can serve to support the inorganic scintillator layer 200 as a polymer material. The polymer layer 300 needs secure transmittance and mechanical flexibility and may be a copolymer of polysulfone, styrene, and methyl lmetacrylate or poly(bisphenol A carbonate).

The wafer layer 400 is disposed under the polymer layer 300 and a photodiode may be formed on the wafer 400. The kind of the wafer layer 400 is not specifically limited, and for example, it may be silicon, zinc oxide, or nitride semiconductor substrate.

The horizontal widths of the radioisotope emission layer 100, the inorganic scintillator layer 200, and the polymer layer 300 are the same, but the horizontal width of the wafer layer 400 may be larger than the horizontal widths of the radioisotope emission layer 100, the inorganic scintillator layer 200, and the polymer layer 300.

The radioisotope emission layer 100, the inorganic scintillator layer 200, and the polymer layer 300 may be disposed in direct contact without a gap therebetween.

That is, the inorganic scintillator layer 200 can detect an alpha particle or a beta particle (beta ray) emitted from the radioisotope emission layer 100, the photodiode (not shown) on the wafer layer 400 can detect light produced by reacting with the alpha particle or a beta particle (beta ray), and particularly, it is possible to detect the light using only an ultra-small amount of radioisotope. A photodiode detector (not shown) can detect an event from the photodiode (not shown) and can generate a random pulse.

Figure 2:
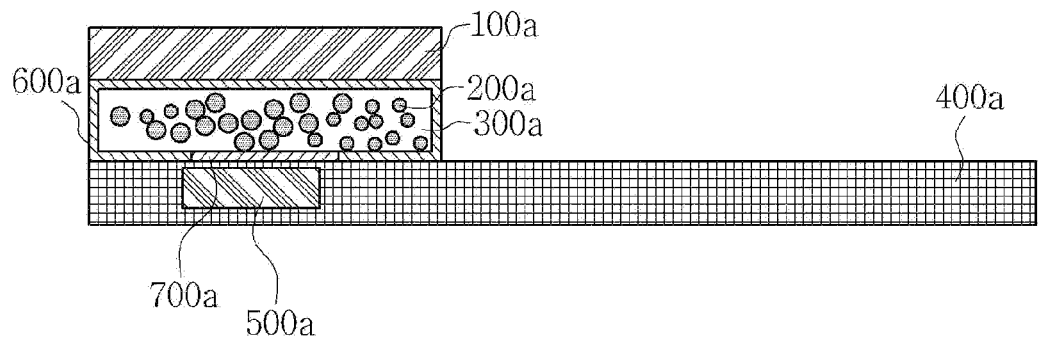
FIG. 2 is a view illustrating a random number generator according to another embodiment of the present disclosure.

FIG. 2 is a view illustrating a random number generator according to another embodiment of the present disclosure. Referring to FIG. 2, a random number generator 10a according to another embodiment of the present disclosure includes a radioisotope emission layer 100a, several inorganic scintillator layers 200a, a polymer layer 300a, and a wafer layer 400a, a photodiode 500a, a reflector 600a, and a coupler 700a. The configuration different from that of the embodiment described with reference to FIG. 1 is mainly described. The polymer layer 300a with several inorganic scintillator particles mixed therein is surrounded by the reflector 600a and the radioisotope emission layer 100a is disposed on the reflector 600a. The wafer layer 400a is disposed under the polymer layer 300a and the photodiode 500a is disposed in the wafer layer 400a to face the polymer layer 300a. The coupler 700a, which has the same width as the photodiode 500a, is disposed between the polymer layer 300a and the wafer layer 400a. That is, the reflector 600a that reflects emitted light and the coupler 700a are disposed, whereby it is possible to increase the light reception efficiency.

Figure 3:
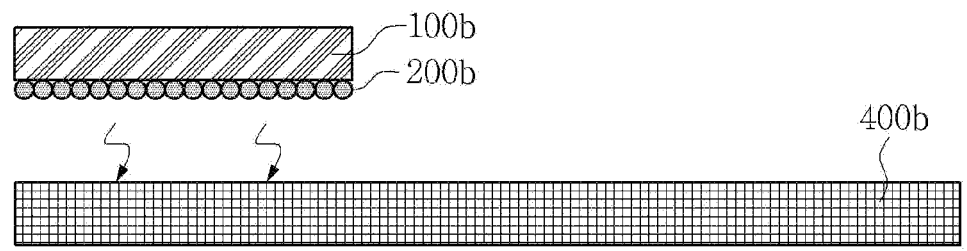
FIG. 3 is a view illustrating a random number generator according to another embodiment of the present disclosure.

FIG. 3 is a view illustrating a random number generator according to another embodiment of the present disclosure. Referring to FIG. 3, a random number generator 10b according to another embodiment of the present disclosure includes a radioisotope emission layer 100b, several inorganic scintillator layers 200b, and a wafer layer 400b. The configuration different from that of the embodiment described with reference to FIG. 1 is mainly described. The several inorganic scintillator layers 200b may be directly applied and disposed under the radioisotope emission layer 100b, and the radioisotope emission layer 100b and the wafer layer 400b are spaced apart from each other.

Figure 4:
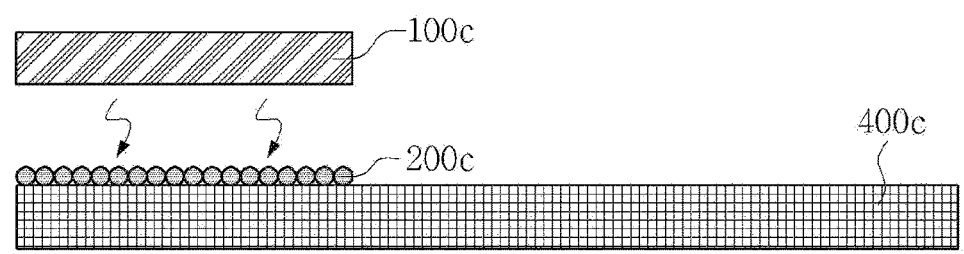
FIG. 4 is a view illustrating a random number generator according to another embodiment of the present disclosure.

FIG. 4 is a view illustrating a random number generator according to another embodiment of the present disclosure. Referring to FIG. 4, a random number generator 10 c according to another embodiment of the present disclosure includes a radioisotope emission layer 100 c, several inorganic scintillator layers 200 c, and a wafer layer 400 c. The configuration different from that of the embodiment described with reference to FIG. 1 is mainly described. The several inorganic scintillator layers 200 c may be directly applied and disposed on the wafer layer 400 c, and the radioisotope emission layer 100 c and the wafer layer 400 c are spaced apart from each other.

Figure 5:
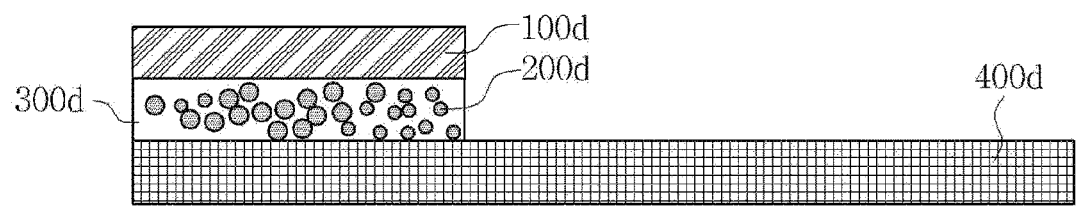
FIG. 5 is a view illustrating a random number generator according to another embodiment of the present disclosure.

FIG. 5 is a view illustrating a random number generator according to another embodiment of the present disclosure. Referring to FIG. 5, a random number generator 10 d according to another embodiment of the present disclosure includes a radioisotope emission layer 100 d, several inorganic scintillator layers 200 d, a polymer layer 300 d, and a wafer layer 400 d. The configuration different from that of the embodiment described with reference to FIG. 1 is mainly described. The several inorganic scintillator layers 200 d are mixed in the polymer layer 300 d, and the polymer layer is disposed between the radioisotope emission layer 100 d and the wafer layer 400 d.

Figure 6:
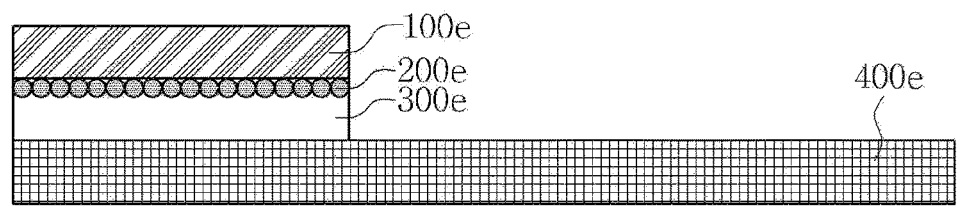
FIG. 6 is a view illustrating a random number generator according to another embodiment of the present disclosure.

FIG. 6 is a view illustrating a random number generator according to another embodiment of the present disclosure. Referring to FIG. 6, a random number generator 10e according to an embodiment of the present disclosure includes a radioisotope emission layer 100e, an inorganic scintillator layer 200e, a polymer layer 300e, and a wafer layer 400e. The configuration different from that of the embodiment described with reference to FIG. 1 is mainly described. The inorganic scintillator layer 200e is deposited in the polymer layer 300d and is disposed in an area adjacent to the radioisotope emission layer 100e. The polymer layer 300e is disposed between the radioisotope emission layer 100e and the wafer layer 400e.

Although the present disclosure has been described with reference to the exemplary embodiments illustrated in the drawings, those are only examples and may be changed and modified into other equivalent exemplary embodiments from the present disclosure by those skilled in the art. Therefore, the technical protective range of the present disclosure should be determined by the scope described in claims.

What is claimed is:

1. A random number generator comprising:
   a radioisotope emission layer emitting an alpha particle or a beta particle that is emitted when an atomic nucleus decays;
   a polymer layer disposed under the radioisotope emission layer and having inorganic scintillator powders mixed therein;
   a wafer layer disposed under the polymer layer and including a photodiode;
   a coupler having the same width as the photodiode, and the coupler disposed between the photodiode and the polymer layer; and
   a reflector disposed around the polymer layer except a part where the coupler is disposed between the photodiode and the polymer layer,
   wherein
   a horizontal width of the radioisotope emission layer is the same as a horizontal width of the polymer layer,
   a horizontal width of the wafer layer is larger than the horizontal widths of the radioisotope emission layer and the polymer layer, and
   the photodiode is formed in an upper part of the wafer layer in order to face the polymer layer.

2. The random number generator of claim 1, wherein the inorganic scintillator powders is ZnS(Ag) and the radioisotope emission layer includes an Am241 radioisotope.

3. The random number generator of claim 1, wherein the radioisotope emission layer and the polymer layer are disposed in direct contact without a gap therebetween.

* * * * *